United States Patent
Katsuyama et al.

(10) Patent No.: US 10,200,592 B2
(45) Date of Patent: Feb. 5, 2019

(54) CAMERA BODY AND IMAGING DEVICE

(71) Applicant: Panasonic Intellectual Property Management Co., Ltd., Osaka (JP)

(72) Inventors: Norikazu Katsuyama, Osaka (JP); Masahiro Inata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/470,461

(22) Filed: Mar. 27, 2017

(65) Prior Publication Data
US 2017/0289436 A1    Oct. 5, 2017

(30) Foreign Application Priority Data

Mar. 29, 2016 (JP) ................. 2016-065324
Feb. 24, 2017 (JP) ................. 2017-033070

(51) Int. Cl.
*H04N 5/232*  (2006.01)
*G02B 7/04*   (2006.01)
*H04N 5/225*  (2006.01)

(52) U.S. Cl.
CPC .......... *H04N 5/23212* (2013.01); *G02B 7/04* (2013.01); *H04N 5/2254* (2013.01)

(58) Field of Classification Search
CPC ..... H04N 5/23209; H04N 5/23212–5/232127; G03B 3/04; G03B 13/32–13/36; G02B 7/04; G02B 7/09; G02B 7/10; G02B 7/102; G02B 7/28; G02B 7/282; G02B 7/36–7/38
See application file for complete search history.

(56) References Cited

U.S. PATENT DOCUMENTS

| | | |
|---|---|---|
| 2005/0280735 A1 | 12/2005 | Nakahara |
| 2011/0001869 A1 | 1/2011 | Hamano |
| 2014/0016018 A1 | 1/2014 | Hamano |
| 2016/0234422 A1* | 8/2016 | Inata ............... H04N 5/2253 |

FOREIGN PATENT DOCUMENTS

| | | |
|---|---|---|
| JP | 2006-030974 A | 2/2006 |
| JP | 2010-107866 A | 5/2010 |
| JP | 2011-013645 A | 1/2011 |
| JP | 2013-015751 A | 1/2013 |

* cited by examiner

*Primary Examiner* — Paul M Berardesca
(74) *Attorney, Agent, or Firm* — Renner Otto Boisselle & Sklar, LLP

(57) ABSTRACT

A camera body according to the present disclosure is a camera body to which a lens barrel including an optical system is detachable and reattachable, the optical system being configured to include a plurality of lenses. The camera body includes: a controller which controls the camera body; an image sensor which obtains an optical image formed by the optical system; and an image sensor driver which drives the image sensor in an optical axis direction of the optical system. The controller detects optical feature amounts of a plurality of frames in a state where the image sensor is at an identical position in the optical axis direction, detects a frame in which a change amount of an optical feature amount calculated from a plurality of the detected optical feature amounts has exceeded a predetermined threshold, and drives the image sensor driver to move the image sensor from the identical position to a reference position provided in a movable range when there is a plurality of the frames in which the change amount has exceeded the predetermined threshold.

14 Claims, 16 Drawing Sheets

CAMERA BODY AND IMAGING DEVICE

BACKGROUND

1. Technical Field

The present disclosure relates to a camera body such as a digital camera which can execute Auto Focus (AF) control by driving an image sensor.

2. Description of the Related Art

Conventionally, there is known a digital camera having a camera body including an image sensor, and a lens barrel which is detachable and reattachable to the camera body (see, for example, Unexamined Japanese Patent Publication No. 2010-107866). Such a digital camera include a focus lens which adjusts a focus, a lens driving part which moves the focus lens in an optical axis direction, and an imaging unit driving part which moves an imaging unit which captures a subject image to the optical axis direction. Further, such a digital camera include a focus evaluation part which outputs as a focus evaluation value a degree of focus on the subject image captured by the imaging unit, and a focus control part which moves the focus lens and the imaging unit based on the focus evaluation value. Furthermore, the imaging unit driving part determines an initial position of the imaging unit based on the output of the focus evaluation part. Thus, the initial position is prevented from going beyond a control range of the imaging unit while the drive of the imaging unit is finely controlled during autofocus.

SUMMARY

A camera body according to the present disclosure is a camera body to which a lens barrel including an optical system is detachable and reattachable, the optical system being configured to include a plurality of lenses. The camera body includes: a controller which controls the camera body; an image sensor which obtains an optical image formed by the optical system; and an image sensor driver which drives the image sensor in an optical axis direction of the optical system. The controller detects optical feature amounts of a plurality of frames in a state where the image sensor is at an identical position in the optical axis direction, detects a frame in which a change amount of an optical feature amount calculated from the detected optical feature amounts has exceeded a predetermined threshold, and drives the image sensor driver to move the image sensor from the identical position to a reference position provided in a movable range when there is a plurality of the frames in which the change amount has exceeded the predetermined threshold.

An imaging device according to the present disclosure includes: a lens barrel which includes a manual operation unit; and the camera body which includes an attachment unit to which the lens barrel is attached.

The camera body and the imaging device according to the present disclosure are effective for performing highly accurate autofocus.

DETAILED DESCRIPTION

Figure 1:
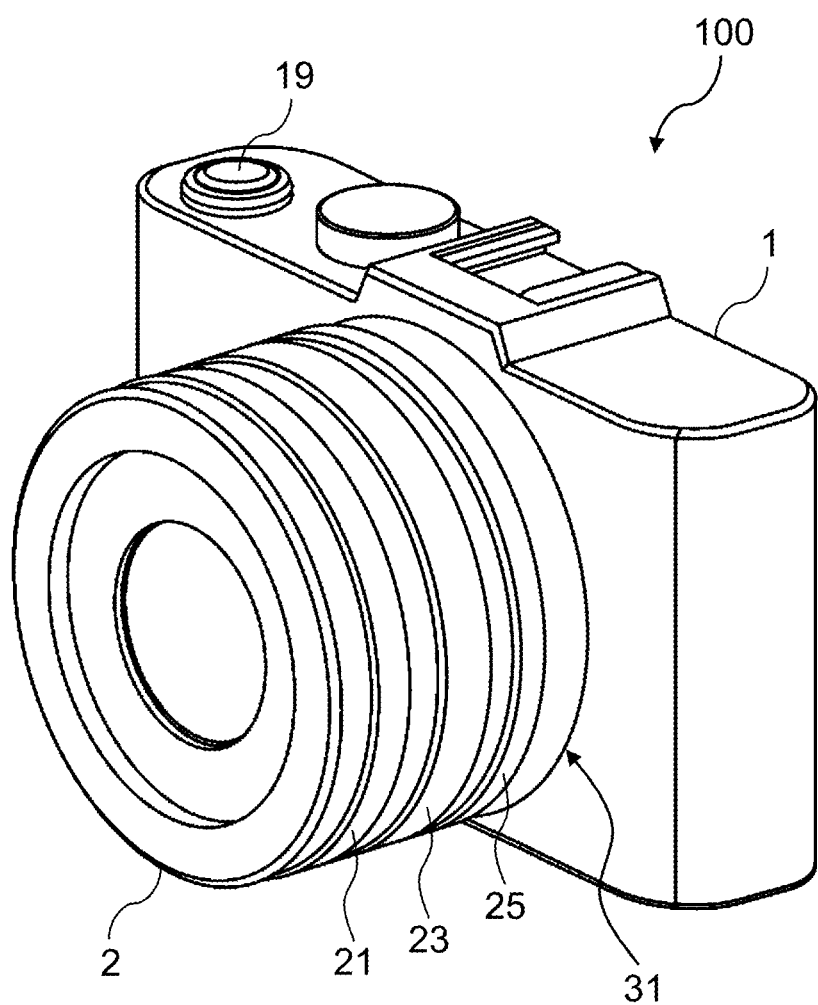
FIG. 1 is an external appearance view of a digital camera according to a first exemplary embodiment.

Exemplary embodiments will be described in detail below with reference to the drawings as appropriate. Note that the exemplary embodiments will not be described in detail more than necessary. For example, matters which have already been well known will not be described in detail, and overlapping description of substantially same components will be omitted. This is to prevent the following description from becoming redundant more than necessary and to help those of ordinary skill in the art understand to the present disclosure.

The inventors of the present disclosure provide the accompanying drawings and the following description to help those of ordinary skill in the art sufficiently understand the present disclosure, and do not intend to limit the subject matter of the claims.

Outline of Camera Body and Imaging Device According to Present Exemplary Embodiment Conventionally, a need for manually operating focus adjustment in lens interchangeable digital cameras and professional digital cameras in particular is high, and manually operating focus adjustment is a mainstream. However, it is difficult to manually adjust the focus since high-definition 4K images need to be supported and a depth of field becomes shallower as an image sensor becomes larger. Hence, a lens barrel side is manually operated for focus adjustment and, in addition, a camera body side is operated for focus adjustment by autofocus.

However, in lens interchangeable digital cameras, when an arbitrary interchangeable lens barrel is attached to a camera body, the lens barrel and the camera body cannot communicate in some cases. In this case, the camera body cannot obtain information from the lens barrel side, and therefore has a problem in accuracy of focus adjustment during autofocus.

To assist such focus adjustment, there is a technique which makes it possible to check a focus position by, for example, enlarging and displaying part of an image through a view finder for a user. Alternatively, there is a technique which makes it possible to check a focus position by highlighting an outline component of an image through a view finder. However, with the former technique, an entire image cannot be checked, operability is poor, and a focus position may be lost when a subject moves. With the latter technique, an edge of an entire image is emphasized, and therefore there is difficulty in determining whether or not the focusing is performed, and an edge component may not appear in a subject of a low contrast.

When a camera body of a digital camera according to the present exemplary embodiment cannot communicate with an attached lens barrel, it is possible to take an advantage of adjustment performed by a manual operation at the lens barrel side, and perform automatic adjustment at the camera body side.

The camera body according to the present exemplary embodiment and an imaging device which includes the camera body will be described in detail below with reference to the drawings.

First Exemplary Embodiment

A first exemplary embodiment and a modified example of the first exemplary embodiment according to the present disclosure will be described below with reference to FIGS. 1 to 7 and 9 to 16.

1-1. Configuration

[1-1-1. Configuration of Digital Camera]

An imaging device according to one exemplary embodiment of the present disclosure will be described by using a lens interchangeable digital camera as an example.

FIG. 1 is an external appearance view of digital camera 100 (an example of the imaging device) according to the first exemplary embodiment. In FIG. 1, digital camera 100 is configured by interchangeable lens barrel 2 (an example of a lens barrel) and camera body 1 (an example of the camera body). Lens barrel 2 having various shooting optical systems (imaging optical systems) is attachable to camera body 1 with mounting unit 31 interposed between camera body 1 and lens barrel 2.

[1-1-2. Configuration of Lens Barrel]

Figure 2:
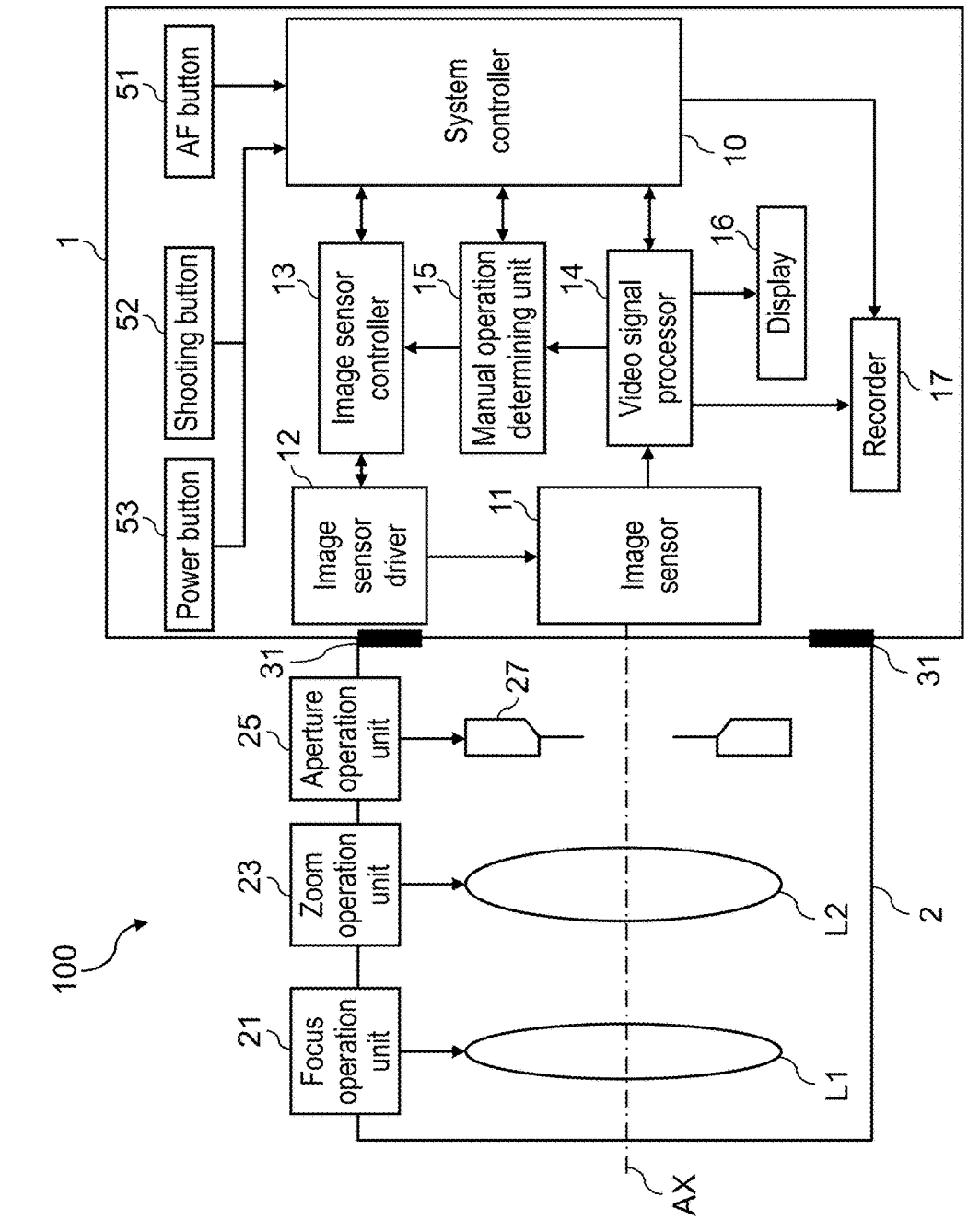
FIG. 2 is a block diagram illustrating an internal configuration of the digital camera according to the first exemplary embodiment.

FIG. 2 is a block diagram illustrating an internal configuration of digital camera 100 according to the first exemplary embodiment. As illustrated in FIG. 2, lens barrel 2 includes focus operation unit 21 (an example of a manual operation unit), zoom operation unit 23 (an example of a manual operation unit), aperture operation unit 25 (an example of a manual operation unit), optical systems such as lenses L1, L2, and aperture 27.

Focus operation unit 21 is configured by a focus ring, for example, as illustrated in FIG. 1. A user operates focus operation unit 21 (by, for example, turning the focus ring) to adjust the focus.

Zoom operation unit 23 is configured by a zoom ring, for example, as illustrated in FIG. 1. The user operates zoom operation unit 23 (by, for example, turning the zoom ring) to adjust zooming such as wide-angle zoom and telephoto zoom.

Lens L1 is an optical system including a focus lens. Lens L1 is moved in a direction of optical axis AX by a predetermined driving mechanism according to a user's operation of focus operation unit 21. Lens L2 is an optical system including a zoom lens. Lens L2 is moved in the direction of optical axis AX by the predetermined driving mechanism according to a user's operation of zoom operation unit 23.

Aperture operation unit 25 is configured by an aperture ring, for example, as illustrated in FIG. 1. The user operates aperture operation unit 25 (by, for example, turning the aperture ring) to adjust an amount of light passing through an opening of aperture 27 by the predetermined driving mechanism.

Aperture 27 adjusts the amount of light passing through lenses L1, L2 by increasing and decreasing an opening area by the predetermined driving mechanism according to a user's operation of aperture operation unit 25.

[1-1-3. Configuration of Camera Body]

As illustrated in FIG. 2, camera body 1 includes system controller 10 (an example of a controller), image sensor 11, image sensor driver 12, image sensor controller 13 (an example of the controller), video signal processor 14, manual operation determining unit 15 (an example of the controller), display 16, recorder 17, mounting unit 31 (an example of an attachment unit), AF button 51 (an example of an operation unit), shooting button 52, and power button 53.

System controller 10 is configured by a processor such as a CPU and a memory, and controls entire camera body 1. Particularly, as described below, system controller 10 is a circuit which detects an optical feature amount of a video signal received from image sensor 11 via video signal processor 14, and executes AF control. Herein, the optical feature amount refers to an amount of information such as a contrast value or a brightness value optically extracted according to whether a signal component is large or small. The optical feature amount will be described as the contrast value in the first exemplary embodiment of the present disclosure.

Image sensor 11 is configured by a charge coupled device (CCD) or a complementary metal-oxide semiconductor (CMOS) sensor. Image sensor 11 converts an optical image obtained via lens barrel 2 into an electrical signal. Image sensor 11 according to the first exemplary embodiment has a size including, for example, a number of pixels supporting 4K images.

Image sensor driver 12 drives image sensor 11 according to signals from image sensor controller 13. Image sensor driver 12 is configured by various actuators such as a motor. Driving of image sensor 11 includes moving image sensor 11 in the direction of optical axis AX during AF control as described below.

Image sensor controller 13 is a circuit which is configured by a processor such as a CPU and a memory, and drives image sensor driver 12 according to instructions of system controller 10 and manual operation determining unit 15.

Manual operation determining unit 15 is a circuit which is configured by a processor such as a CPU and a memory, and determines whether or not lens barrel 2 is manually operated as described below. Herein, the manual operation refers to a manual operation at a lens barrel 2 side, and is an operation of changing an optical state of an image obtained by image sensor 11 by, for example, performing a focus operation, a zoom operation, and an aperture operation.

Video signal processor 14 is a circuit which is configured by a processor such as a CPU and a memory, and processes an output signal of image sensor 11, and outputs the output signal as image information to display 16 and recorder 17.

Display 16 is configured by liquid crystal or organic EL, and displays an output signal, i.e., image data from video signal processor 14.

Recorder 17 is a semiconductor memory such as an SD card or an SSD, and stores an output signal, i.e., image data from video signal processor 14.

Mounting unit 31 adopts a structure on which lens barrel 2 of various types to be interchanged is mountable.

AF button 51 is operated by a user to output a signal for instructing AF control described below. More specifically, AF button 51 transmits signals to system controller 10. System controller 10 instructs image sensor controller 13 to perform an operation for AF control based on the contrast value of the image signal from video signal processor 14.

Shooting button 52 is operated by the user to instruct video signal processor 14 via system controller 10 to record image information. Shooting is executed by this operation.

Power button 53 is operated by the user to turn on or off a power supply of camera body 1.

System controller 10, image sensor controller 13, manual operation determining unit 15, and video signal processor 14 of camera body 1 may be partially or entirely configured by one processor (an example of the controller) or an integrated circuit (an example of the controller).

Camera body 1 determines a predetermined optical change in the image signal input via image sensor 11, i.e., a change in an optical state of a subject image as a user's manual operation of lens barrel 2.

1-2. Operation

The operation of camera body 1 according to the present exemplary embodiment will be described below with reference to FIGS. 3 to 7 and 9 to 14.

[1-2-1. Entire Operation]

Figure 3:
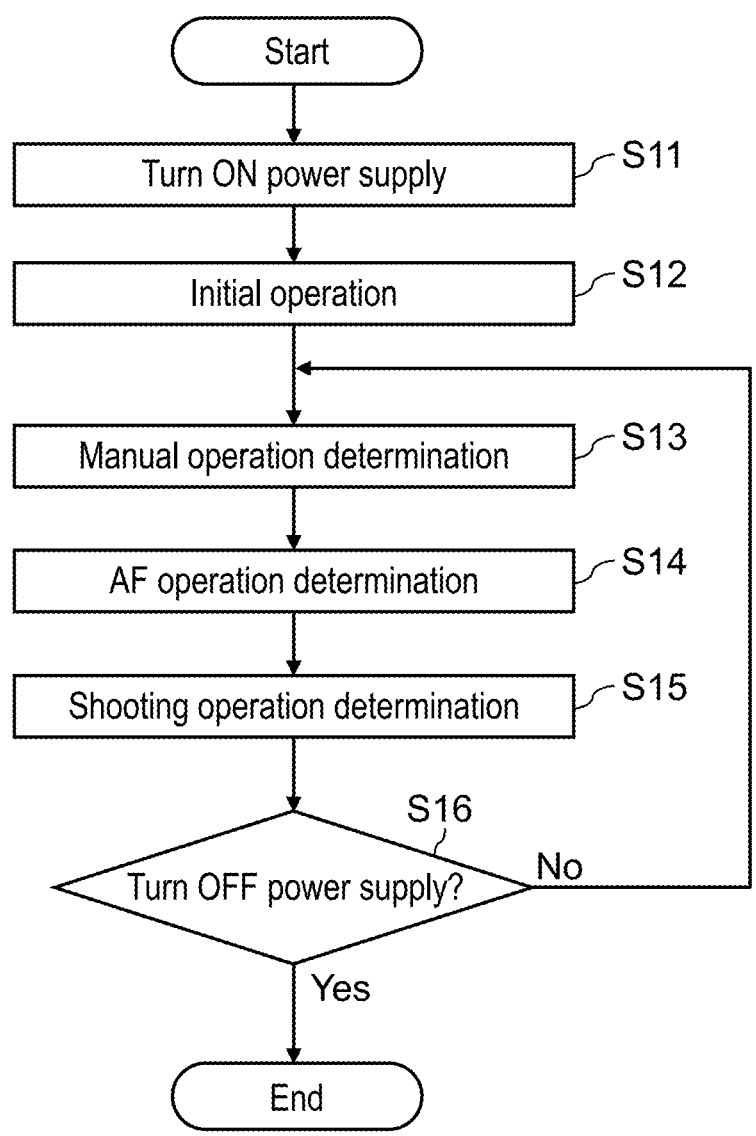
FIG. 3 is a flowchart illustrating an entire operation of a camera body of the digital camera according to the first exemplary embodiment.

FIG. 3 is a flowchart illustrating an entire operation of camera body 1 according to the first exemplary embodiment. A series of operations illustrated in FIG. 3 are mainly executed by system controller 10.

S11: System controller 10 detects that the power supply of camera body 1 has been turned on when the user operates power button 53.

S12: System controller 10 executes an initial operation. As described below, the initial operation includes returning a position of image sensor 11 in the direction of optical axis AX to a predetermined reference position (described below), and initializing a determination parameter for determining the manual operation.

S13: Manual operation determining unit 15 determines whether or not lens barrel 2 has been manually operated, based on the image signal from video signal processor 14. This determination processing will be described in detail below.

S14: System controller 10 executes determination on an AF operation. Further, system controller 10 performs autofocus adjustment by AF control when it is determined that the AF operation has been performed. This processing will be described in detail below.

S15: System controller 10 executes shooting operation determination. Further, system controller 10 executes the shooting operation when it is determined that the shooting operation has been performed. This processing will be described in detail below.

S16: System controller 10 repeats the processing in steps S13 to S15 unless it is detected that the power supply is turned off. The processing is finished when it is detected the power supply has been turned off.

<Reference Position of Image Sensor 11>

Since image sensor 11 has a movable range in the direction of optical axis AX, the position (reference position) of image sensor 11 at the start of AF control is set in advance so as that AF control is appropriately performed. A reason why the reference position of image sensor 11 is set will be described with reference to FIGS. 9 and 10.

Figure 9:
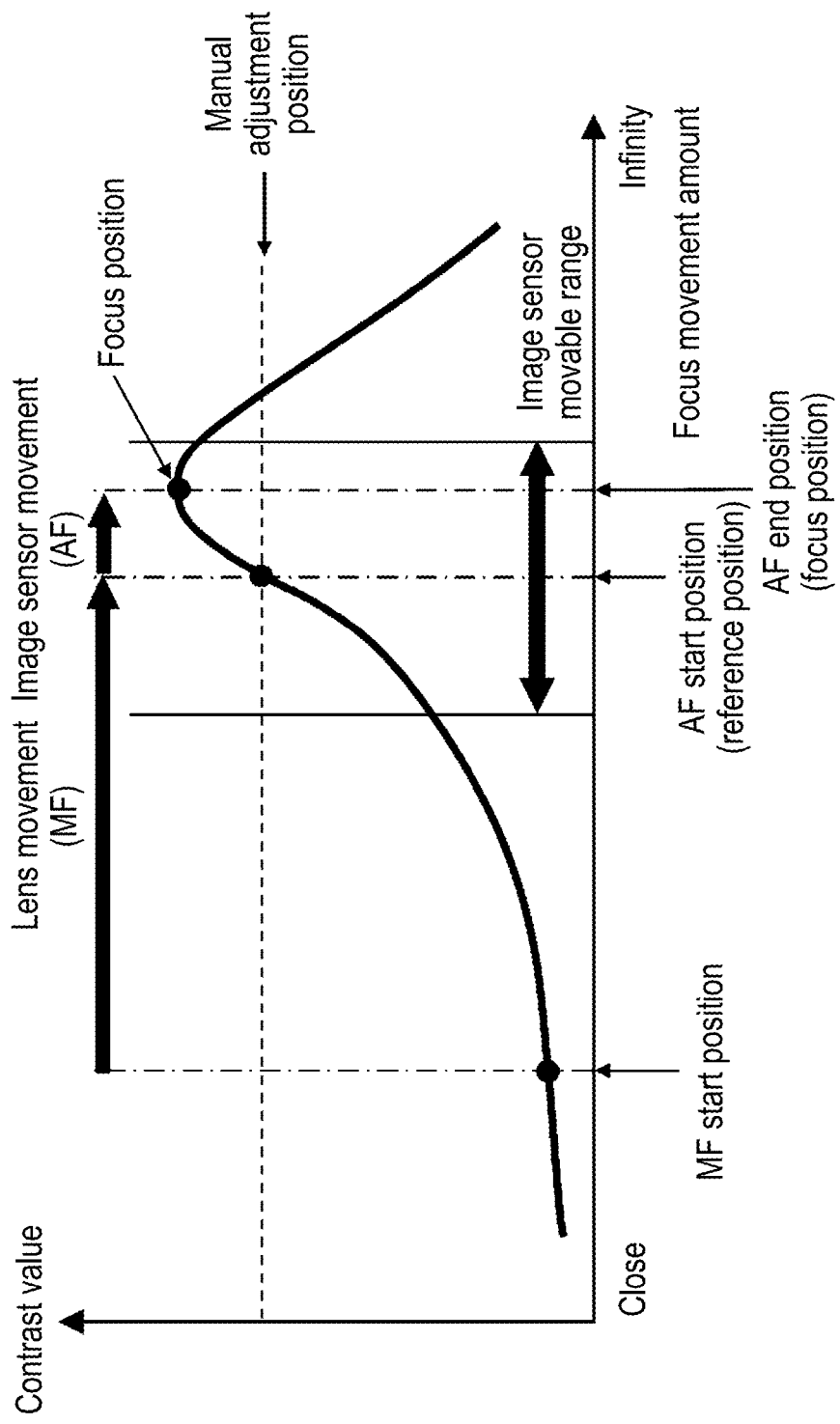
FIG. 9 is an operation explanatory view of an image sensor of the camera body according to the first exemplary embodiment.
Figure 10:
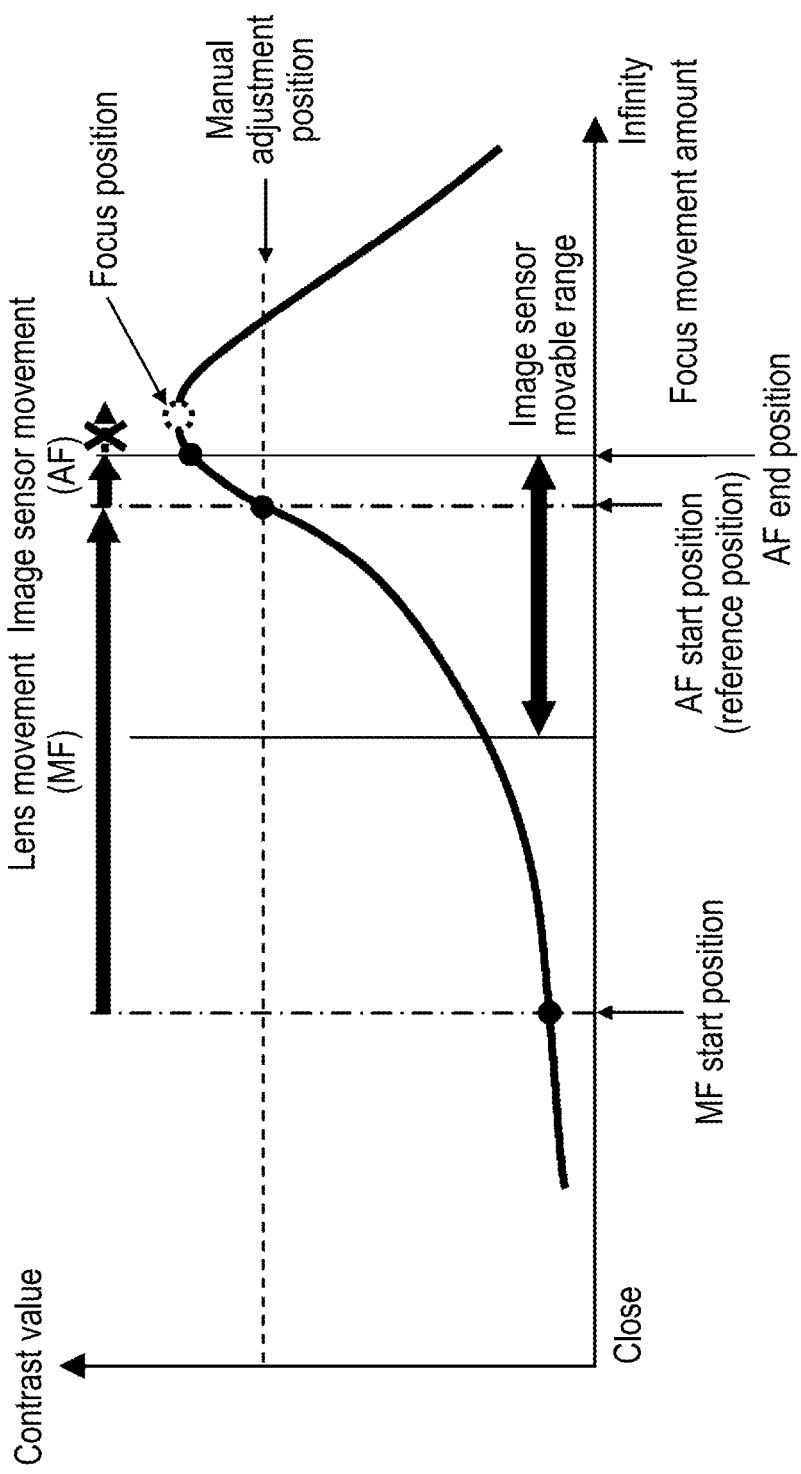
FIG. 10 is an operation explanatory view of the image sensor of the camera body according to the first exemplary embodiment.

FIGS. 9 and 10 are operation explanatory views of image sensor 11 of camera body 1 according to the first exemplary embodiment. In FIGS. 9 and 10, horizontal axes indicate a position of image sensor 11 in the direction of optical axis AX from a close side focus state (left sides in FIGS. 9 and 10) to an infinity side focus state (right sides in FIGS. 9 and 10), and vertical axes indicate a contrast value of an image signal corresponding to the position of image sensor 11. As illustrated in FIGS. 9 and 10, movement of image sensor 11 in the direction of optical axis AX is limited to a predetermined movable range. Consequently, it is desirable to make it possible to start AF control from the position (reference position) at which AF control can be reliably performed by moving image sensor 11 in the movable range.

Hence, in the first exemplary embodiment, as illustrated in FIG. 9, an AF start position of image sensor 11 is set to a substantially center of the movable range. More specifically, the user manually operates (manual focus adjustment) lens barrel 2 to move lenses L1, L2, adjust a focus, move image sensor 11 by AF control, and thereby detect a final focus position. In this case, image sensor 11 is positioned at the substantially center of the movable range, so that it is possible to prevent a focus position (the position of image sensor 11 at which the contrast value is maximized) from departing from the movable range of image sensor 11 during AF control.

FIG. 10 illustrates an example in which the AF start position of image sensor 11 is close to the infinity side of the movable range. In this example, the focus position is positioned outside the movable range of image sensor 11 under the AF control. Hence, there is a concern that a focus state cannot be realized since image sensor 11 cannot be moved to an optimal focus position in the example in FIG. 10.

Hence, according to an initial operation described below, the position of image sensor 11 is set such that the focus position is in the movable range of image sensor 11 under the AF control.

[1-2-2. Initial Operation]

Detailed processing of the initial operation executed in S12 in FIG. 3 will be described.

When the power supply of camera body 1 is turned on, system controller 10 outputs an instruction signal to image sensor driver 12 via image sensor controller 13, and moves image sensor 11 to the reference position.

Further, system controller 10 initializes the determination parameter used for manual operation determination processing described below. More specifically, an AF-Pos value for recording the position of image sensor 11 after AF, and a Reset-Pos value for recording the position of image sensor 11 while manual operation determination is performed are both set to 0 (zero). A value (zero) at the time of initialization of AF-Pos indicates the reference position of image sensor 11.

System controller 10 moves to the manual operation determination processing in step S13 in FIG. 3 when the initial operation is finished.

[1-2-3. Manual Operation Determination]

Figure 4:
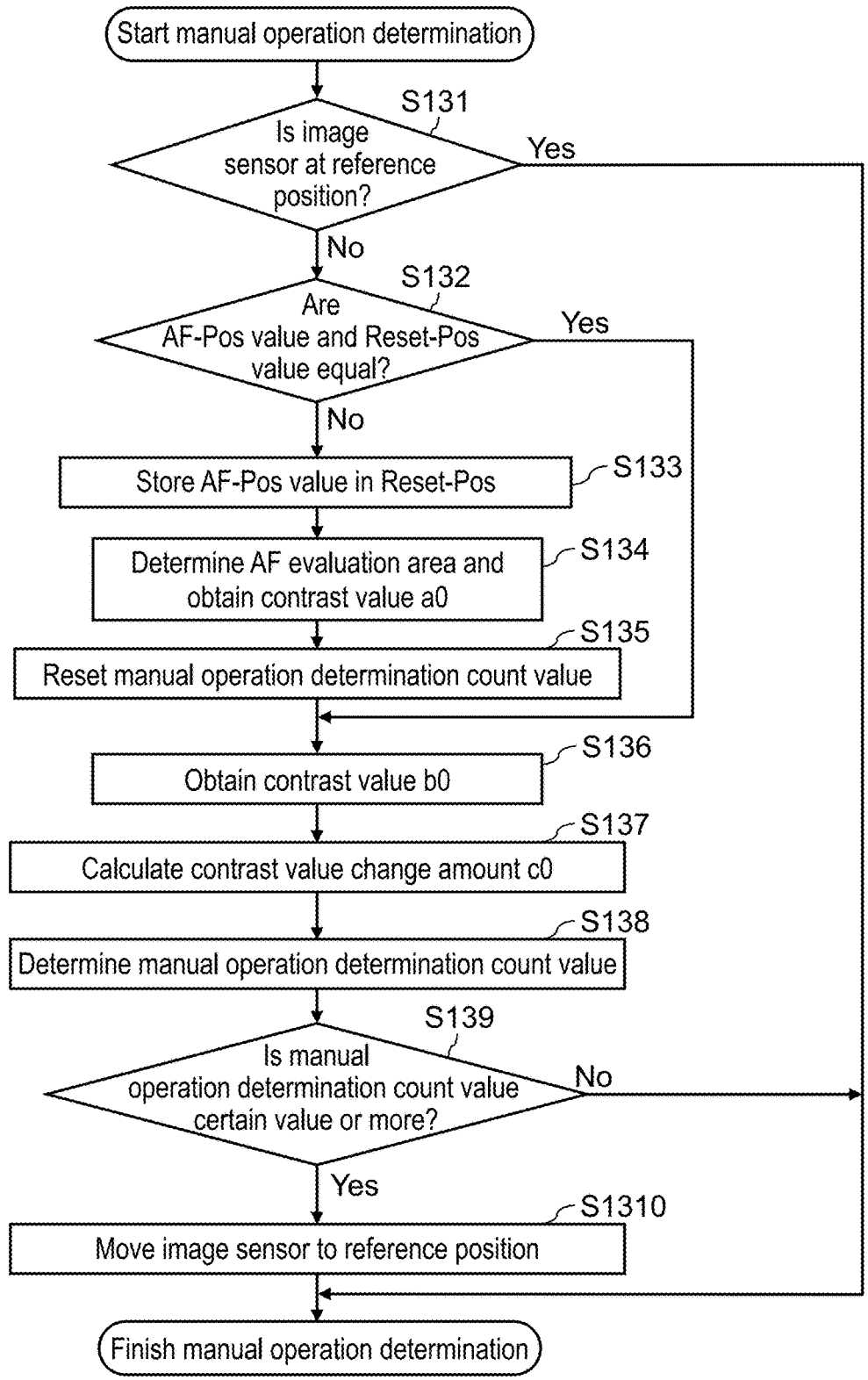
FIG. 4 is a flowchart including manual operation determination of the camera body according to the first exemplary embodiment.

FIG. 4 is a flowchart illustrating detailed processing of the manual operation determination executed in S13 in FIG. 3. In FIG. 4, camera body 1 detects a change in a state of an image signal input via image sensor 11, and determines whether or not lens barrel 2 has been manually operated.

S131: First, manual operation determining unit 15 determines whether or not image sensor 11 is at the reference position. After the power supply is turned on, the position of image sensor 11 does not move from the reference position until an AF operation is performed. Hence, it is determined that image sensor 11 does not move from the reference position until the AF operation is performed, and the manual operation determination is finished. When the AF operation moves image sensor 11, a current position (AF-Pos) of image sensor 11 changes from 0 of the reference position, and therefore it is determined that image sensor 11 has moved from the reference position, and the processing moves to step S132.

S132: Manual operation determining unit 15 determines whether or not a condition of a manual operation determination criterion is satisfied. A case where the condition of the manual operation determination criterion is satisfied refers to a case where the AF-Pos value and the Reset-Pos value are equal to each other.

When step S132 is performed for a first time after the power supply of camera body 1 is turned on, the position of image sensor 11 at a point of time at which the AF control is executed for a first time is recorded as the AF-Pos value. The Reset-Pos value of the position of image sensor 11 during the manual operation determination as the result of initial operation in S12 is 0, and therefore the AF-Pos value and the Reset-Pos value are not equal to each other. In this case, the processing moves to step S133 to update a manual operation determination condition.

Meanwhile, when the AF-Pos value of the position of image sensor 11 at an end of AF, and the Reset-Pos value of the position of image sensor 11 during the manual operation determination are equal to each other, i.e., when the manual operation determination condition does not change, a past manual operation determination count value is taken over, and therefore the processing moves to step S136.

S133: Manual operation determining unit 15 writes the AF-Pos value of a position at which the AF operation is finished, in Reset-Pos of the position of the image sensor during the manual operation determination. When writing of the value is finished and updating the manual determination condition is finished, the processing moves to step S134.

S134: System controller 10 obtains contrast value a0 which is used to determine whether or not the manual operation is performed and is obtained after the AF control.

Figure 11:
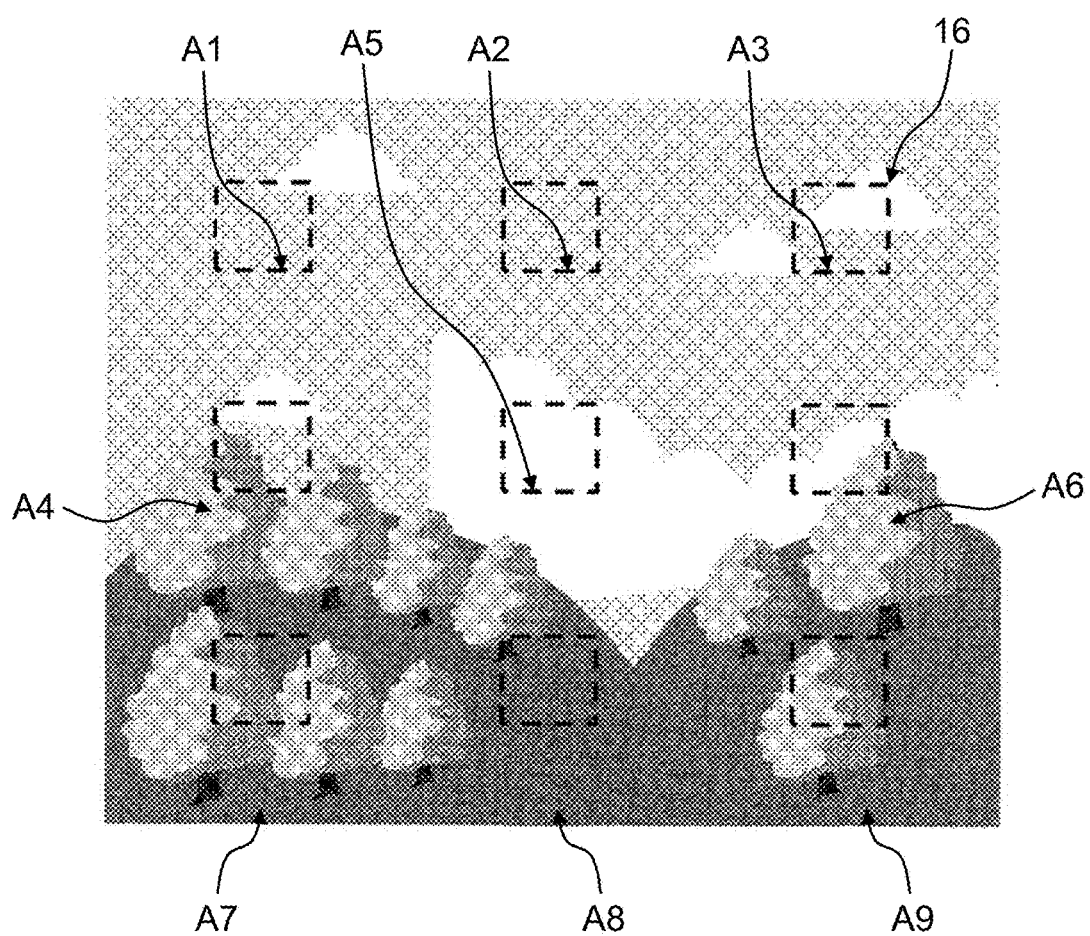
FIG. 11 is an explanatory view illustrating manual operation determination of the camera body according to the first exemplary embodiment.

FIG. 11 is an explanatory view illustrating the manual operation determination of camera body 1 according to the first exemplary embodiment. In FIG. 11, one of nine AF evaluation areas A1 to A9 in one screen for which autofocus adjustment has been lastly performed is determined. A contrast value for an image signal of the determined AF evaluation area is determined, and a maximum contrast value is selected. Further, selected maximum contrast value a0 is stored in a memory (not illustrated).

S135: Manual operation determining unit 15 resets manual operation determination count value Rcont (to zero). In the first exemplary embodiment, the manual operation determination is performed over a plurality of frames. Hence, the AF operation changes the position of image sensor 11 in the optical axis direction, and the manual operation determination count value is held until the manual operation determination condition is not satisfied. Hence, when the manual operation determination condition is not satisfied in step S132, the past manual operation determination count value is not taken over, and the manual operation determination count value is reset.

S136: Manual operation determining unit 15 obtains contrast value b0 of the image on which the AF operation has been performed, based on the image signal obtained by image sensor 11, and stores contrast value b0 in the memory (not illustrated). Note that contrast value b0 is obtained for each frame.

S137: Manual operation determining unit 15 calculates contrast value change amount c0 based on contrast value b0 obtained in step S136 and contrast value a0 obtained during the AF operation or at the time of shooting, and stores contrast value change amount c0 in the memory. More specifically, contrast value change amount c0 is an absolute value of a difference between reference contrast value a0 and contrast value b0 obtained for each frame.

S138: Manual operation determining unit 15 determines whether or not to increment the manual operation determination count value by 1 based on contrast value change amount c0 calculated in step S137.

S139: Manual operation determining unit 15 determines whether or not manual operation determination count value Rcont is a certain value or more. When manual operation determination count value Rcont is the certain value or more, the processing moves to step S1310 and, when manual operation determination count value Rcont is less than the certain value, the manual operation determination is finished, and the processing moves to step S14 in FIG. 3.

S1310: Manual operation determining unit 15 moves image sensor 11 to the reference position via image sensor controller 13 and image sensor driver 12. When the movement to the reference position is finished, the AF-Pos value is set to zero. Further, manual operation determination count value Rcont is reset to 0 (zero), and the manual operation determination is finished. The processing moves to step S14 in FIG. 3, and system controller 10 performs AF operation determination.

<Determination of Manual Operation Determination Count Value>

Figure 5:
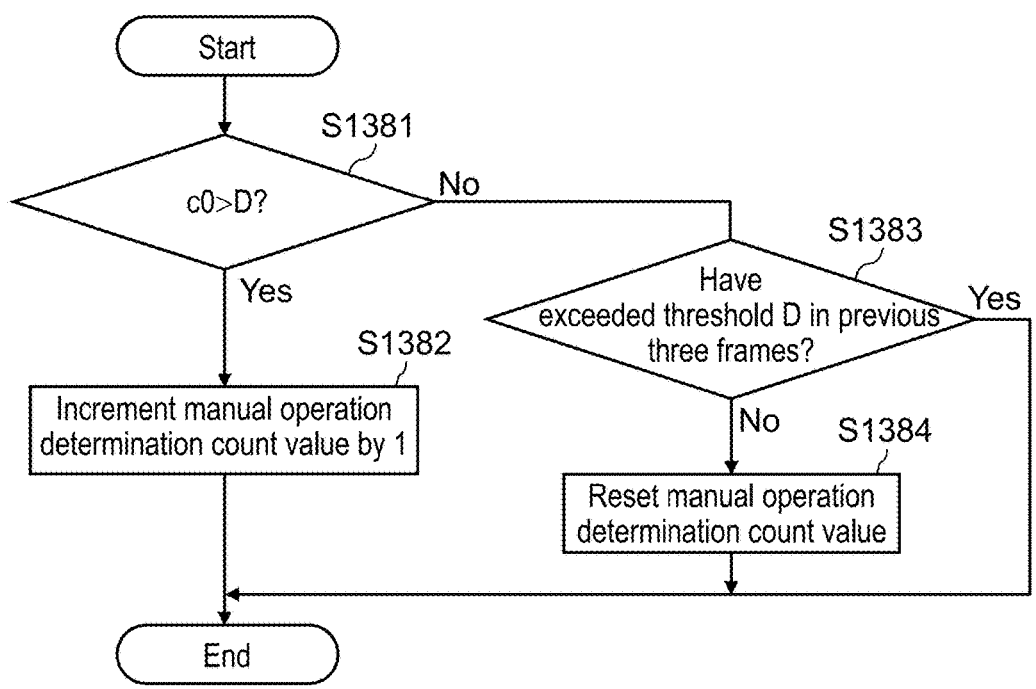
FIG. 5 is a flowchart for describing determination of a manual operation determination count value of the camera body according to the first exemplary embodiment.

FIG. 5 is a flowchart for describing step S138 in FIG. 4 in detail.

S1381: Manual operation determining unit 15 determines whether or not contrast value change amount c0 calculated in step S137 exceeds threshold D. The processing moves to step S1382 when contrast value change amount c0 exceeds threshold D, and moves to step S1383 when contrast value change amount c0 does not exceed threshold D.

S1382: Manual operation determining unit 15 increments manual operation determination count value Rcont by 1. When the incrementation is finished, the flow is finished.

S1383: Manual operation determining unit 15 determines whether or not contrast value change amount c0 has been threshold D or less in three previous frames. The processing moves to step S1384 in the case where contrast value change amount c0 has been threshold D or less, and the flow is finished in the case where contrast value change amount c0 has exceeded threshold D.

S1384: Manual operation determining unit 15 resets manual operation determination count value Rcont to 0 (zero). By monitoring the previous frames and resetting manual operation determination count value Rcont in the case where contrast value change amount c0 has been threshold D or less, it is possible to prevent accumulation of counted-up manual operations due to instantaneous subject movement and a disturbance other than the manual operation of lens barrel 2, and reduce erroneous determination. When the incrementation is finished, the flow is finished.

Thus, when camera body 1 and lens barrel 2 are not electrically connected, whether or not an optical state of an image is changed by manually operating lens barrel 2 is determined based on the image signal (herein, contrast value change amount c0) obtained by image sensor 11. However, it is necessary to prevent a change in the contrast value due to an instantaneous motion of a subject and a disturbance from being determined as a manual operation. Hence, in the first exemplary embodiment, contrast values of optical images obtained by image sensor 11 are continuously measured. That is, a plurality of contrast values b0 is detected in time series in frames units for reference contrast value a0, contrast value change amount c0 is calculated for each frame, and whether or not the manual operation is performed is determined based on a level of a change in contrast value change amount c0.

Figure 12:
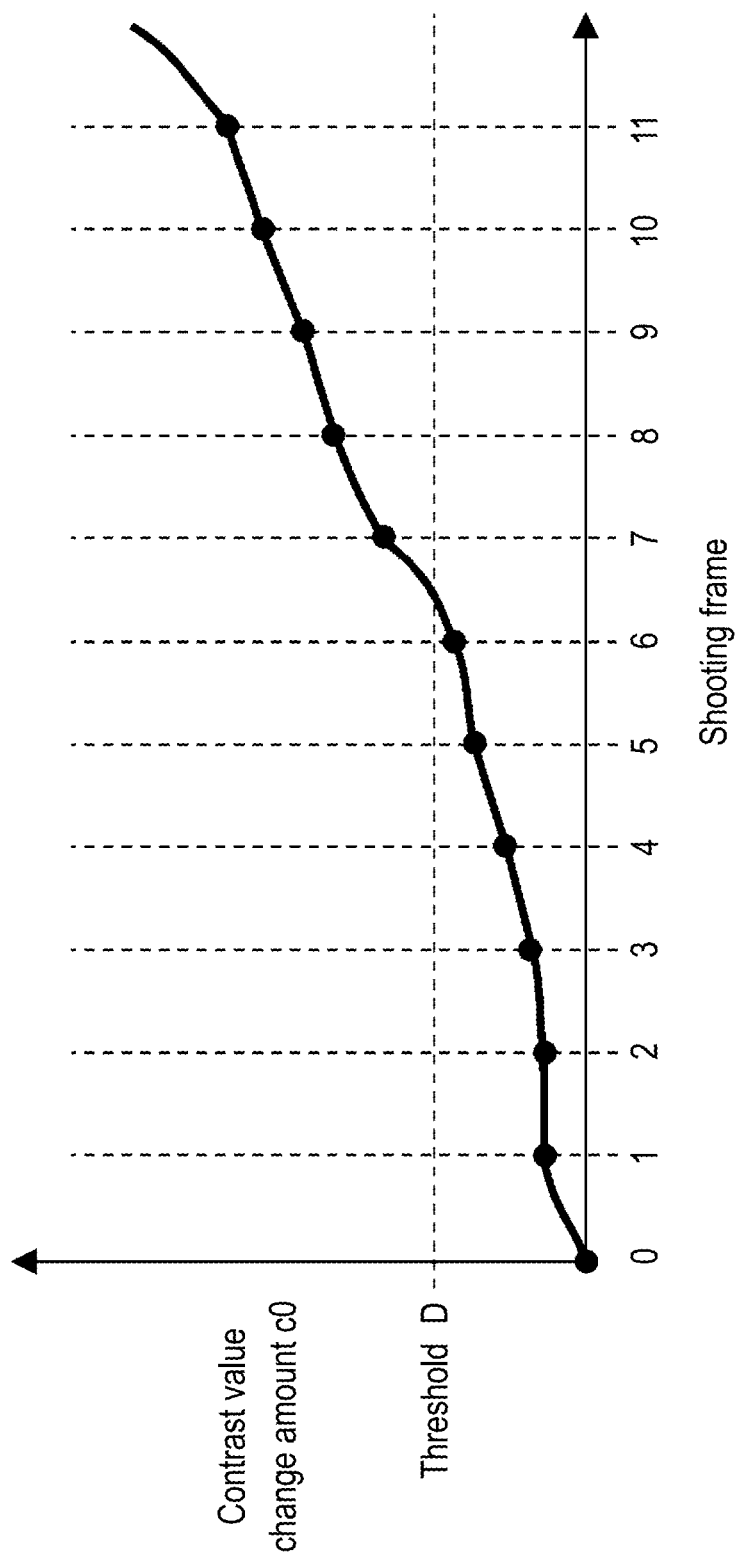
FIG. 12 is an explanatory view illustrating manual operation determination of the camera body according to the first exemplary embodiment.
Figure 13:
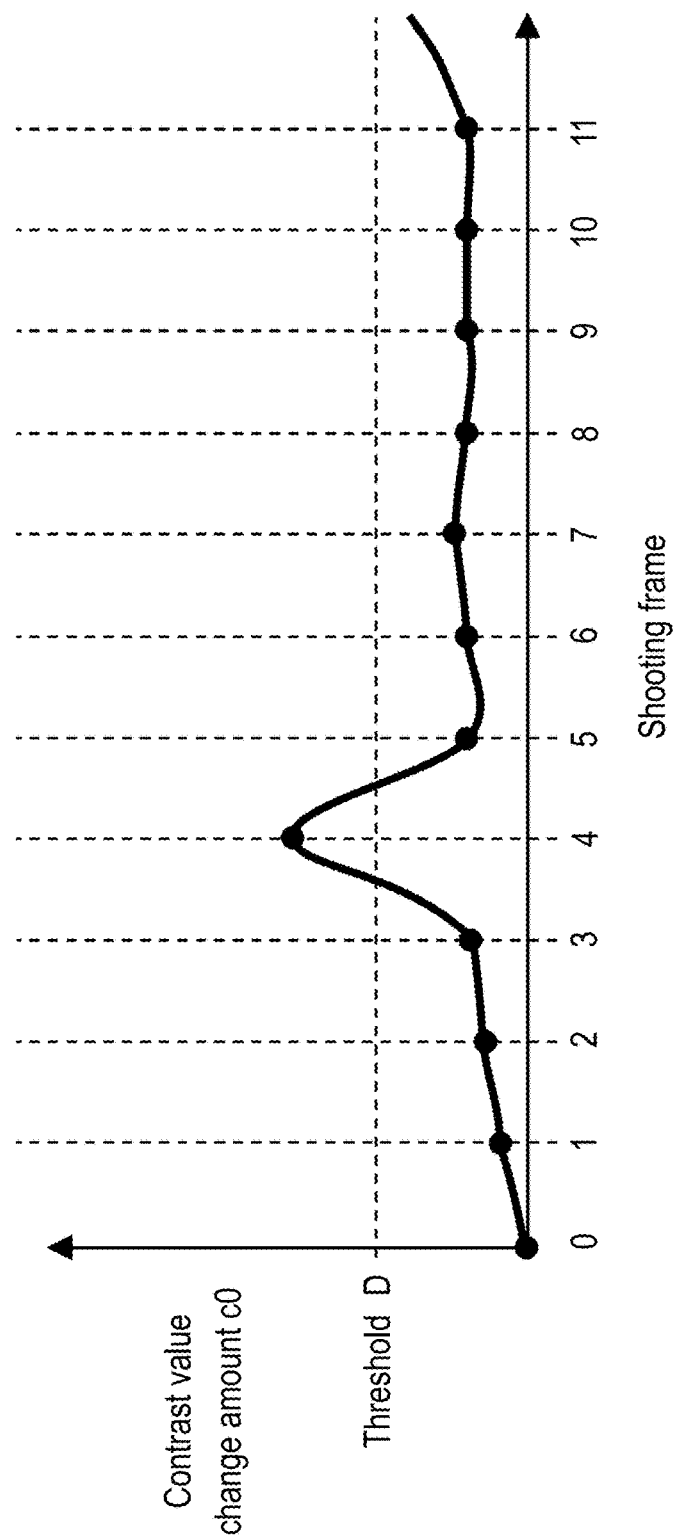
FIG. 13 is an explanatory view illustrating manual operation determination of the camera body according to the first exemplary embodiment.

FIGS. 12 and 13 are views illustrating contrast value change amount c0 corresponding to a lapse of time based on reference contrast value a0 obtained after the AF operation is finished or after shooting is finished. In FIGS. 12 and 13, vertical axes indicate contrast value change amount c0, and horizontal axes indicate a number of frames of images obtained by the image sensor when the number of frames is 0 at the end of the AF operation or at the end of shooting.

In the case of the example illustrated in FIG. 12, measurement starts assuming that the number of frames subsequent to a seventh frame in which contrast value change amount c0 is threshold D or more is manual operation determination count value Rcont. When a count value of the number of frames in which a contrast value change amount exceeds threshold D is five or more, it is determined that the operation is the manual operation. In other words, when the number of frames in which a contrast value change amount exceeds threshold D is the certain value or more, it is determined that the manual operation has been performed. In the example illustrated in FIG. 12, contrast value change amount c0 monotonically increases with lapse of time, and therefore counting is started from the seventh frame, manual operation determination count value Rcont takes a value of 5 in an eleventh frame, and it is determined that the operation is the manual operation.

On the other hand, in the example illustrated in FIG. 13, contrast value change amount c0 exceeding threshold D is detected in a fourth frame. However, the change amount returns to threshold D or less from a next fifth frame, and it is determined that contrast value change amount c0 has instantaneously increased due to an instantaneous motion of a subject and a disturbance, and it is not determined that the operation is the manual operation. Further, contrast value change amount c0 is threshold D or less for a certain period in frames subsequent to the fifth frame, and therefore the manual operation determination count value counted in the fourth frame is reset to zero. Thus, it is possible to eliminate an increase in a manual operation determination count value in the case where contrast value change amount c0 exceeds threshold D due to a rapid motion.

[1-2-4. AF Operation Determination]

Figure 6:
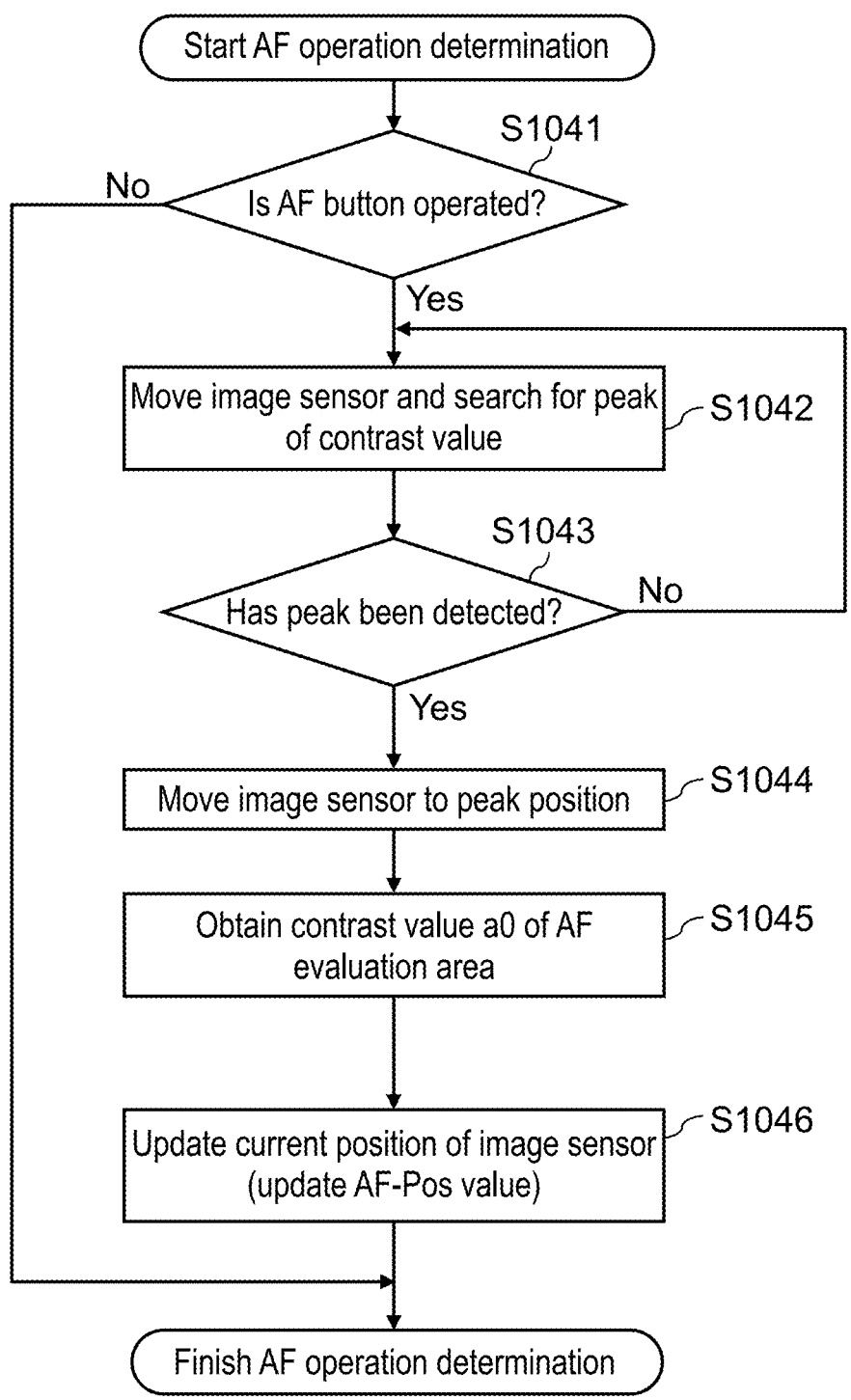
FIG. 6 is a flowchart including AF operation determination of the camera body according to the first exemplary embodiment.

FIG. 6 is a flowchart illustrating detailed processing of the AF operation determination executed in S14 in FIG. 3.

S1041: System controller 10 detects an operation of AF button 51. More specifically, when the user pushes AF button 51, system controller 10 receives a signal from AF button 51.

S1042: Image sensor controller 13 outputs an instruction signal to image sensor driver 12 according to an instruction from system controller 10 to move image sensor 11 back and forth along the direction of optical axis AX. System controller 10 detects a contrast value of an image area specified by the user in advance, from the image signal from video signal processor 14. Further, image sensor 11 is stopped at the position at which the contrast value comes to a peak (maximum value). This operation is repeated until a focus position is detected.

Figure 14:
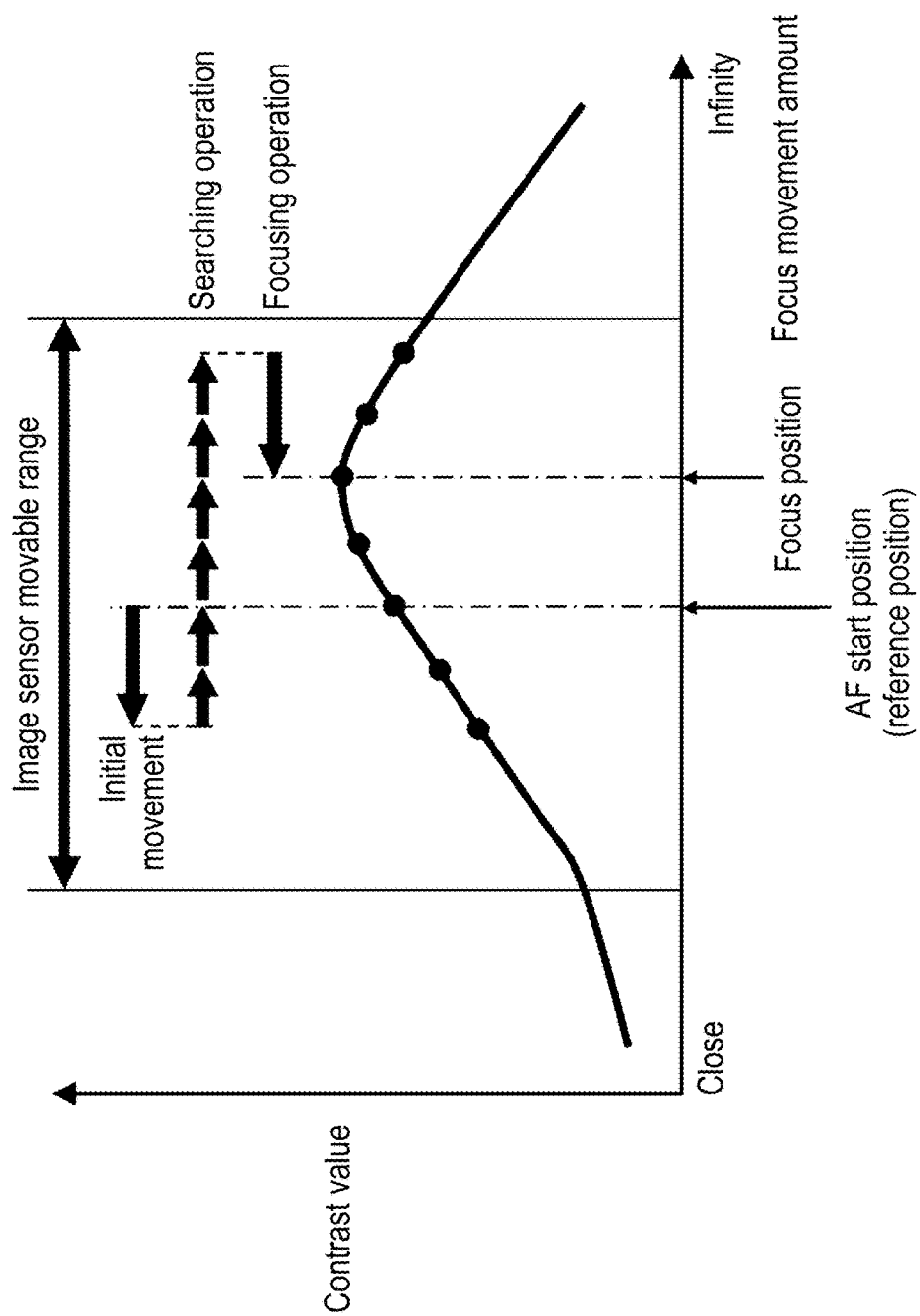
FIG. 14 is an explanatory view illustrating AF control of the camera body according to the first exemplary embodiment.

FIG. 14 is view for describing an operation of image sensor 11 during AF control of camera body 1 according to the first exemplary embodiment. When the AF control is started, image sensor 11 is at the reference position (see S131 and S1310 in FIG. 4). In this case, system controller 10 does not know at which of the close side (a left side in FIG. 14) or an infinity side (a right side in FIG. 14) of image sensor 11 the focus position is. Hence, initial movement is executed as illustrated in FIG. 14. When image sensor 11 makes the initial movement toward the close side and contrast value b0 is lowered, system controller 10 detects that the focus position is at the infinity side with respect to the reference position. Meanwhile, when image sensor 11 makes the initial movement toward the close side and the contrast value rises, system controller 10 detects that the focus position is at the close side with respect to the reference position. In FIG. 14, the focus position is positioned at the infinity side with respect to the reference position, and therefore system controller 10 can execute an operation of searching for the focus position by moving image sensor 11 toward the infinity side.

S1043: System controller 10 detects whether or not the contrast value has exceeded a peak value.

S1044: System controller 10 calculates the focus position from the contrast value near the peak value obtained by the searching operation, and moves image sensor 11 to a position corresponding to this result.

S1045: System controller 10 newly obtains contrast value a0 in the AF evaluation area for which the autofocus adjustment has been performed, stores contrast value a0 in the memory, and updates contrast value a0 (see FIG. 11).

S1046: System controller 10 obtains a current position of image sensor 11, and records a value of this position in AF-Pos.

After the AF operation determination processing, system controller 10 moves to processing in step S15.

[1-2-5. Shooting Operation Determination]

Figure 7:
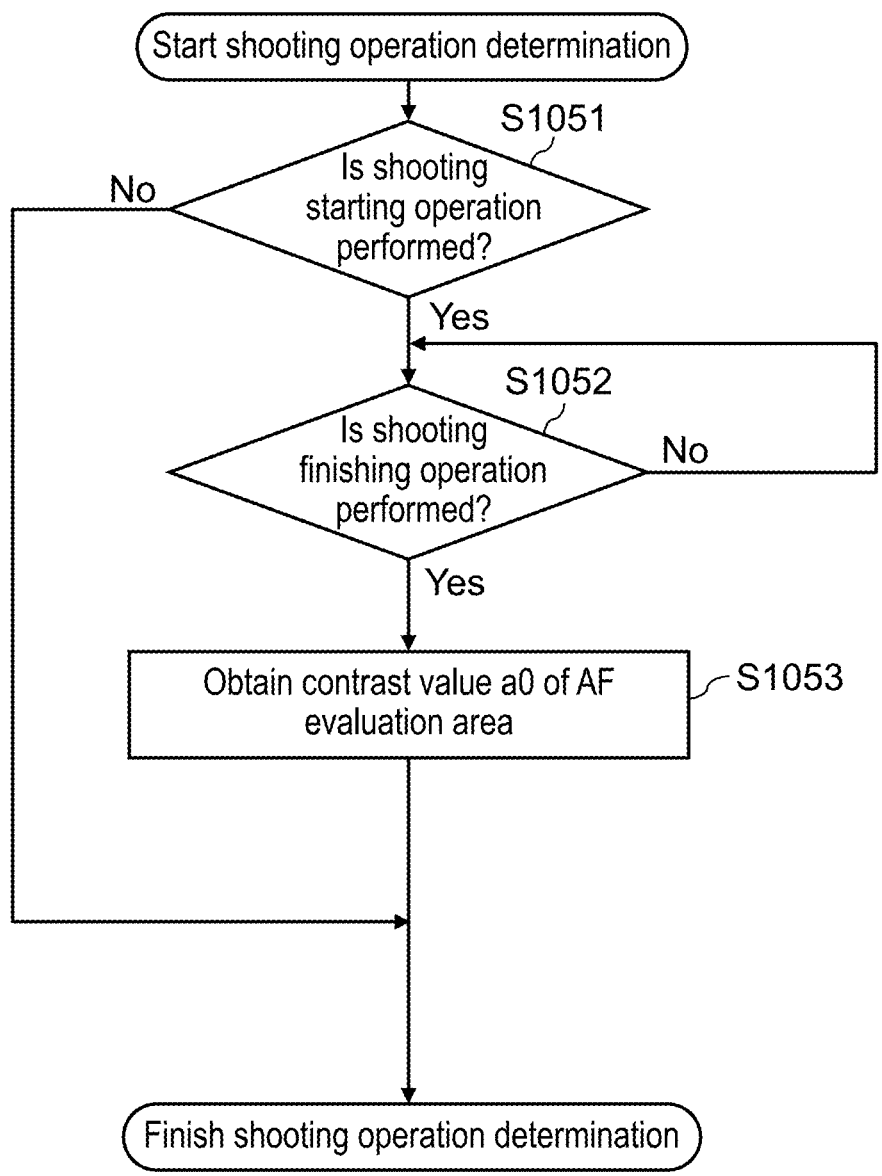
FIG. 7 is a flowchart including shooting operation determination of the camera body according to the first exemplary embodiment.

FIG. 7 is a flowchart illustrating detailed processing of the shooting operation determination executed in S15 in FIG. 3.

S1051: System controller 10 detects an operation of shooting button 52. More specifically, when the user pushes shooting button 52, system controller 10 receives a signal from shooting button 52.

S1052: When system controller 10 detects that the shooting operation has been finished, the processing moves to step S1053.

S1053: System controller 10 obtains current contrast value a0 in an image area for which the focus adjustment has been performed, stores contrast value a0 in the memory, and updates contrast value a0.

When the user manually operates lens barrel 2 during shooting, for example, even when the user performs a zooming operation using zoom operation unit 23 for rendition of video images during shooting, by additionally obtaining the contrast value of the image area immediately after the shooting (S1053), it is possible to prevent an influence caused by a change in a reference contrast value due to a change in an angle of view and improve accuracy for manual operation determination.

1-3. Effects and the Like

As described above, according to the first exemplary embodiment, lens barrel 2 (an example of the lens barrel) including lenses L1, L2 is attachable to camera body 1 (an example of the camera body). Further, camera body 1 includes system controller 10 (an example of the controller) which controls camera body 1, image sensor controller 13, manual operation determining unit 15, image sensor 11 (an example of the image sensor) which obtains a subject image, and image sensor driver 12 (an example of the image sensor driver) which drives image sensor 11 in the direction of optical axis AX. Controllers 10, 13, 15 determine a change in an optical state of the subject image obtained by image sensor 11, and drives image sensor driver 12 according to this determination result to move image sensor 11 to the predetermined reference position in this movable range.

Consequently, camera body 1 can determine whether or not the manual operation has been performed at the lens barrel 2 side, and perform optical adjustment at the camera body 1 side based on this determination result. Consequently, even when information from the lens barrel side is not obtained, camera body 1 can perform optical adjustment corresponding to a manual operation of the lens barrel side. Consequently, even when, for example, camera body 1 and lens barrel 2 cannot communicate, it is possible to manually perform a focusing operation at the lens barrel 2 side, and then execute the AF control at the camera body 1 side.

Further, according to the first exemplary embodiment, the optical adjustment is performed at the camera body 1 side by taking advantage of the manual operation performed at the lens barrel 2 side. Consequently, it is possible to realize a camera such as a professional camera for which a need for a manual operation is high and which is easy for the user to handle.

Further, digital camera 100 (an example of the imaging device) according to the first exemplary embodiment includes: lens barrel 2 (an example of the lens barrel) including focus operation unit 21 (an example of the manual operation unit), zoom operation unit 23, and aperture operation unit 25; and camera body 1 including mounting unit 31 (an example of the attachment unit) to which lens barrel 2 is attached. Consequently, even when information from the lens barrel side is not obtained, it is possible to perform optical adjustment corresponding to a manual operation of the lens barrel at the camera body 1 side.

1-4. Modified Example of First Exemplary Embodiment

A reference position of image sensor 11 is not limited to a center of a movable range. For example, the reference position may be set to an end of the movable range.

Figure 15:
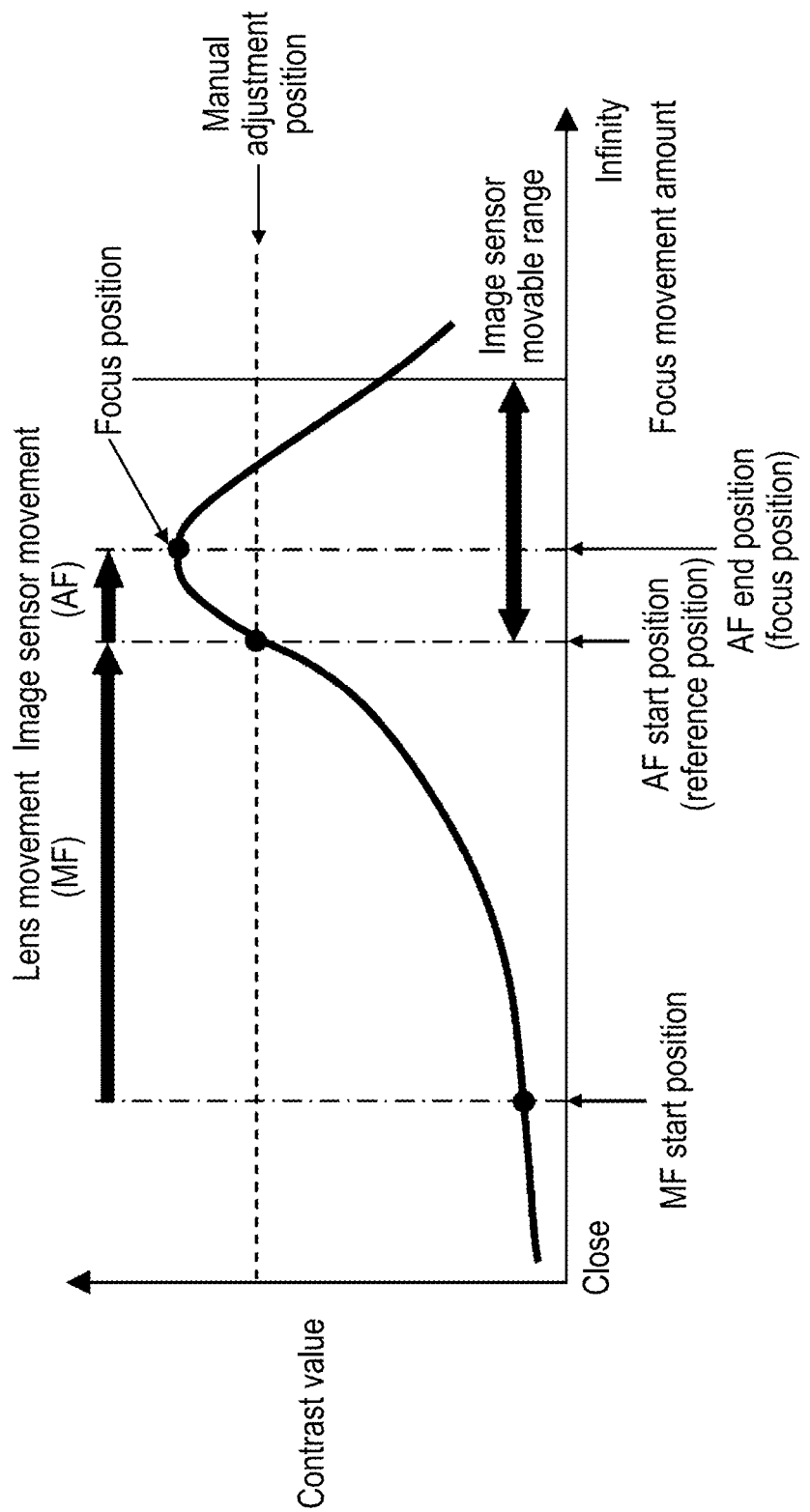
FIG. 15 is an operation explanatory view of an image sensor according to a modified example of the first exemplary embodiment.
Figure 16:
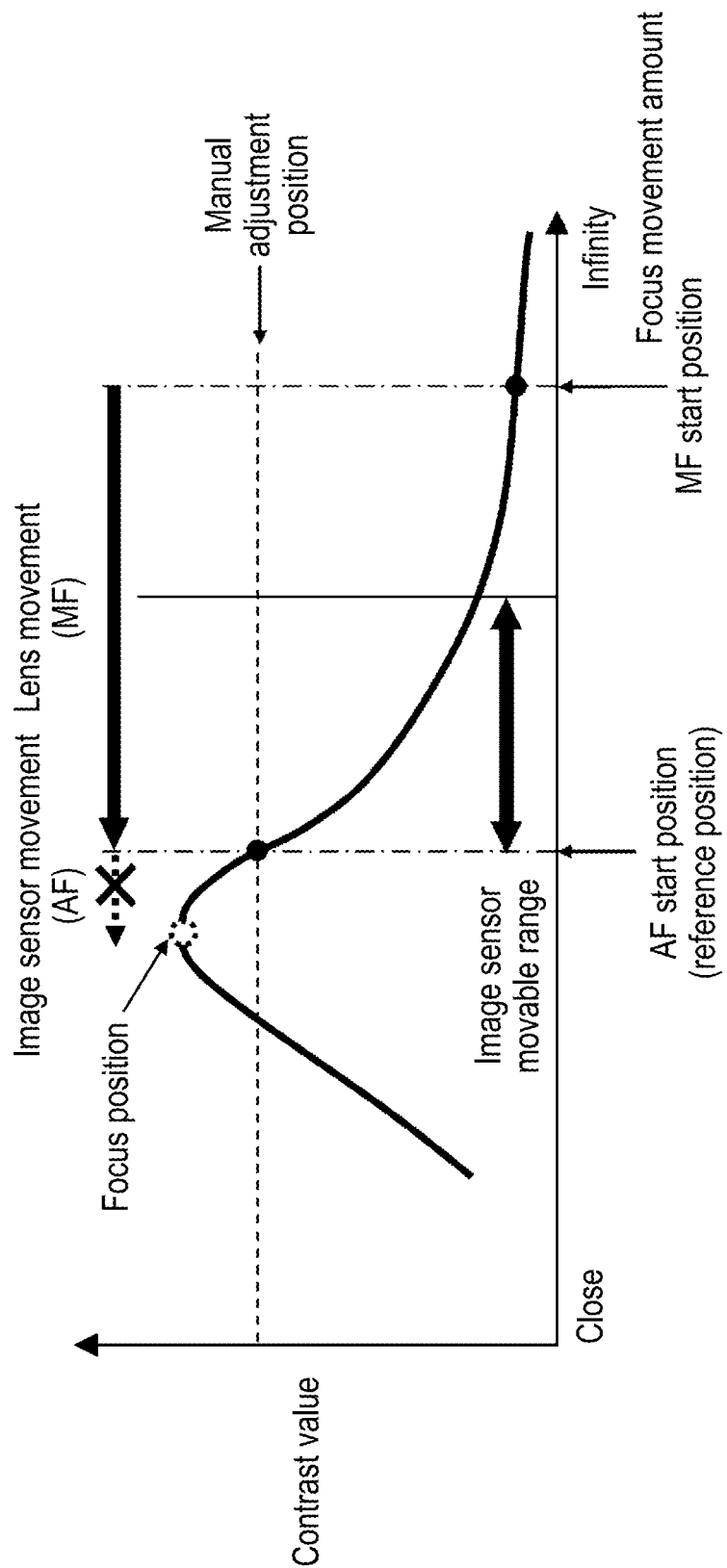
FIG. 16 is an operation explanatory view of the image sensor according to the modified example of the first exemplary embodiment.

FIGS. 15 and 16 are operation explanatory views of an image sensor in a case where the reference position of image sensor 11 is set to a close side end. In FIGS. 15 and 16, a user manually operates (manual focus adjustment) lens barrel 2, and adjusts a focus position to a position at an infinity side with respect to the reference position. This is because, when the manual operation is performed to adjust the focus position to the close side with respect to the reference position, image sensor 11 cannot move close to the close side beyond the reference position.

Hence, for example, the focus position cannot be detected by an operation illustrated in FIG. 16.

As illustrated in FIG. 15, when image sensor 11 is set to the close side end of the movable range, image sensor controller 13 controls image sensor driver 12 after starting AF control, and causes image sensor 11 to make search movement to the infinity side. The focus position is adjusted and positioned at the infinity side by the manual operation, so that it is possible to detect a peak (maximum value) of a contrast value. Other points are the same as S1041 to S1046 in FIG. 6.

According to the above configuration, image sensor 11 does not need to perform an initial operation to detect a direction of a peak and secure a wide range of the AF control. Consequently, it is possible to relax a request for accuracy to manually operate focus adjustment, and it is also easy to perform signal processing.

Note that, even when the reference position of image sensor 11 is set to an infinity side end of the movable range, it is possible to provide the same effect. In this case, the user adjusts and positions the focus position at the close side with respect to the reference position by manually operating lens barrel 2, and causes image sensor 11 to make search movement to the close side.

Second Exemplary Embodiment

Next, an operation of camera body 1 according to the second exemplary embodiment will be described with reference to FIG. 8. Differences from the first exemplary embodiment will be mainly described in the second exemplary embodiment. Note that, configurations of camera body 1 and lens barrel 2 are the same as configurations according to the first exemplary embodiment, and therefore will not be described.

In the first exemplary embodiment, a manual operation is determined based on a change in a contrast value of one image area for which focus adjustment has been performed by an AF operation.

Camera body 1 according to the second exemplary embodiment determines whether or not a manual operation has been performed, based on a contrast value of an area (AF evaluation area) for a plurality of AF evaluations set to an entire screen of an image obtained by image sensor 11 during manual operation determination. That is, manual operation determining unit 15 sets AF evaluation areas at a plurality of different positions in the image to be obtained, and detects respective contrast values. As illustrated in FIG. 11, each AF evaluation area targets at an image signal in a predetermined area among frames which are display units or image signals corresponding to one screen. In an example illustrated in FIG. 11, evaluation areas A1 to A9 disposed covering the entire screen of display 16 are set. Note that, positions and a number of the AF evaluation areas are not limited to those illustrated in FIG. 11.

2-2. Operation

The second exemplary embodiment differs from the first exemplary embodiment in a method for determining an AF evaluation area and a manual operation determination count value illustrated in FIG. 4 (S134 and S138). Differences of the operation of camera body 1 according to the second exemplary embodiment from an operation in the first exemplary embodiment will be mainly described below with reference to a flowchart illustrated in FIG. 8.

<Determination of AF Evaluation Area>

System controller 10 selects an AF evaluation area used to determine whether or not a manual operation is performed, based on contrast values of a plurality of AF evaluation areas A1 to A9. It is desired that many AF evaluation areas used for manual operation determination. However, in a case where a subject includes both a person and a landscape, the person existing nearby is focused, and the landscape is defocused in relation to a depth of field. In this case, outputs of contrast values of AF evaluation areas set to the landscape become small compared to the person. The AF evaluation areas whose outputs of the contrast values are small are likely to unstably change the contrast values compared to the AF evaluation areas near a focus position, and therefore are not desirably used for the manual operation determination. Hence, remaining AF evaluation areas except for AF evaluation areas whose outputs of contrast values are a certain value or less are selected based on an output result to the contrast values of the AF evaluation areas for which focus adjustment has been performed by an AF operation. Further, the contrast values of the AF evaluation areas may be classified into two according to whether the outputs of the contrast values are large or small, and only an AF evaluation area group with larger outputs may be selected.

<Determination of Manual Operation Determination Count Value>

Figure 8:
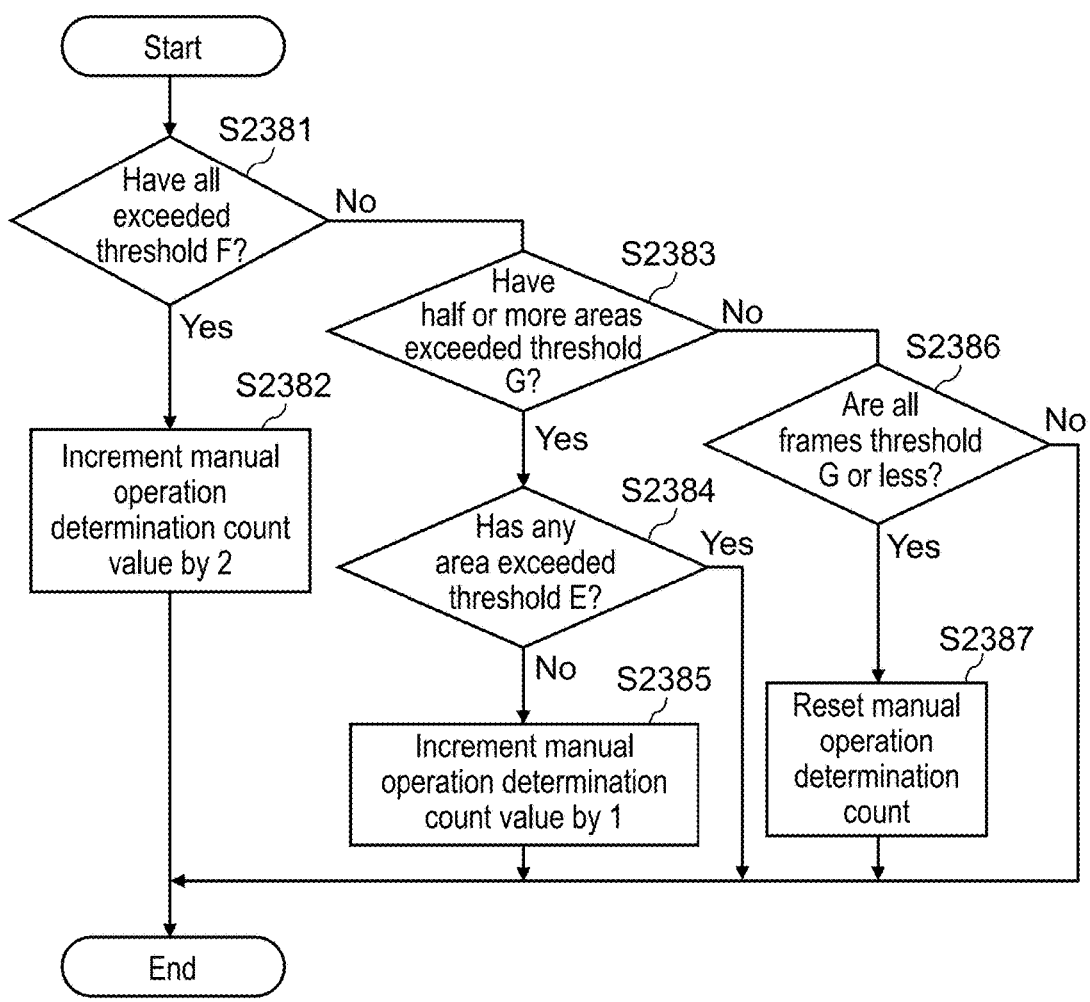
FIG. 8 is a flowchart for describing determination of a manual operation determination count value of a camera body according to a second exemplary embodiment.

FIG. 8 is a flowchart for describing determination of a manual operation determination count value according to the second exemplary embodiment in step S138 in FIG. 4.

S2381: Manual operation determining unit 15 determines whether or not all contrast value change amounts of the selected AF evaluation areas (contrast value change amounts c01 to c09 corresponding to nine AF evaluation areas A1 to A9 in the case of FIG. 11) exceed threshold F (which is, for example, 20% of a change amount with respect to a maximum contrast value). The processing moves to step S2382 when it is determined that all the contrast value change amounts exceed threshold F, and moves to step S2383 when it is determined that all the contrast value change amounts do not exceed threshold F.

S2382: Manual operation determining unit 15 increments manual operation determination count value Rcont by 2. When the incrementation is finished, the flow is finished.

S2383: Manual operation determining unit 15 determines whether or not of half or more of contrast value change amounts c01 to c09 of the selected AF evaluation areas exceed threshold G. The processing moves to step S2384 when half or more of the contrast value change amounts of the AF evaluation areas exceed threshold G, and moves to step S2386 when half or more of the contrast value change amounts of the AF evaluation areas do not exceed threshold G.

S2384: Manual operation determining unit 15 determines whether or not any of contrast value change amounts c01 to c09 of the selected AF evaluation areas exceed threshold E (which is, for example, 50% of a change amount with respect to the maximum contrast value). The flow is finished when any of the contrast value change amounts of the AF evaluation areas exceed threshold E, and the processing moves to S2385 when none of the contrast value change amounts of the AF evaluation areas exceed threshold E.

S2385: Manual operation determining unit 15 increments manual operation determination count value Rcont by 1. When the incrementation is finished, the flow is finished.

S2386: Manual operation determining unit 15 determines whether or not all contrast value change amounts c01 to c09 of the selected AF evaluation areas are threshold G or less (which is, for example, 10% of a change amount with respect to the maximum contrast value). When all the contrast value change amounts are threshold G or less, it is determined that a manual operation is not performed, and the processing moves to S2387. On the other hand, when there is at least one AF evaluation area in which a contrast value change amount exceeds threshold G, the flow is finished.

S2387: Manual operation determining unit 15 resets manual operation determination count value Rcont to 0 (zero). Consequently, it is possible to prevent an increase in manual operation determination count value Rcont due to an instantaneous subject movement or a disturbance, and reduce erroneous determination.

Here, a relationship between numerical values of the thresholds described in S2381 to S2387 (a change rate of contrast values with respect to the maximum contrast value) is E (50%)>F (20%)>G (10%). In this flow chart, significant defocus due to a manual operation, a slight defocus due to a manual operation and a local change in a subject due to an operation other than a manual operation are determined based on the contrast value change amounts to determine whether or not to reset an image sensor to a reference position. More specifically, whether or not the manual operation causes the significant defocus is determined in S2381, whether or not the manual operation causes the slight defocus is determined in S2383, and whether or not the operation other than the manual operation locally changes the subject is determined in S2384.

2-2. Effect and the Like

As described above, according to the second exemplary embodiment, lens barrel 2 (an example of the lens barrel) including lenses L1, L2 is attachable to camera body 1 (an example of the camera body). Further, camera body 1 includes system controller 10 (an example of the controller) which controls camera body 1, image sensor controller 13, manual operation determining unit 15, image sensor 11 (an example of the image sensor) which obtains a subject image, and image sensor driver 12 (an example of the image sensor driver) which drives image sensor 11 in the direction of optical axis AX. Controllers 10, 13, 15 determine a change in an optical state of the subject image obtained by image sensor 11, and drives image sensor driver 12 according to this determination result to move image sensor 11 to the predetermined reference position in this movable range.

Consequently, camera body 1 can determine whether or not the manual operation has been performed at the lens barrel 2 side, and perform optical adjustment at the camera body 1 side based on this determination result. Consequently, even when information from the lens barrel side is not obtained, camera body 1 can perform optical adjustment corresponding to a manual operation of the lens barrel side. Consequently, even when, for example, camera body 1 and lens barrel 2 cannot communicate, it is possible to execute the AF control corresponding to a focusing operation at the camera body 1 side by manually operating the focusing operation at the lens barrel 2 side.

Further, according to the second exemplary embodiment, the optical adjustment is performed at the camera body 1 side by taking advantage of the manual operation at the lens barrel 2 side. Consequently, it is possible to realize a camera such as a professional camera for which a need for a manual operation is high and which is easy for the user to handle.

Further, digital camera 100 (an example of the imaging device) according to the second exemplary embodiment includes lens barrel 2 (an example of lens barrel 2) which includes focus operation unit 21 (an example of the manual operation unit), zoom operation unit 23, and aperture operation unit 25, and camera body 1 which includes mounting unit 31 (an example of the attachment unit) to which lens barrel 2 is attached. Consequently, even when information from the lens barrel side is not obtained, it is possible to perform optical adjustment corresponding to a manual operation of the lens barrel at the camera body 1 side.

Further, digital camera 100 according to the second exemplary embodiment determines whether or not lens barrel 2 has been manually operated based on a change in contrast values of an image obtained by the image sensor by using the contrast values of a plurality of portions of the image. Consequently, it is possible to prevent an instantaneous change in contrast values due to an instantaneous motion of a subject or a disturbance from being erroneously determined as a manual operation.

Other Exemplary Embodiments

The first and second exemplary embodiments have been described above as an exemplary technique disclosed in this application. However, the technique according to the present disclosure is not limited thereto, and is also applicable to exemplary embodiments for which changes, replacements, additions, and omissions are carried out as appropriate.

Hence, the other exemplary embodiments will be described.

In camera body 1, although a contrast value of an image signal is used as an evaluation value for manual operation determination, a brightness value may also be used. Further, the contrast value is not limited to a contrast value in an AF evaluation area, and a representative value of all contrast values of image signals corresponding to one screen may be used. Meanwhile, a representative value of brightness values of a plurality of AF evaluation areas of image signals corresponding to one screen may be used for the brightness value.

In camera body 1 described in the first and second exemplary embodiments, a maximum value as a representative value of a contrast value is used for the evaluation value of the manual operation determination. However, an average value or a median value may also be used. Further, an optical feature amount may be compared for each AF evaluation area, and a manual operation may be determined based on a change in the optical feature amount in one or a plurality of AF evaluation areas.

In camera body 1 described in the first and second exemplary embodiments, each block of system controller 10, image sensor controller 13, video signal processor 14, and manual operation determining unit 15 may be individually formed into one chip by a semiconductor device such as an LSI, or part or all of the blocks may be formed into one chip.

Part or all of processing of each functional block in each of the exemplary embodiment may be realized by a computer program. Further, each processing of the first and second exemplary embodiments may be realized by hardware or software (including an OS (operating system), middleware, or a predetermined library). Furthermore, each processing may be realized by mixed processing of the software and the hardware.

Still further, order to execute the processing method in the first and second exemplary embodiments is not necessarily limited to the description of the exemplary embodiments, and the execution order can be rearranged without departing from the gist of the present disclosure.

The processing method executed by camera body 1, a computer program which causes a computer to execute this processing method, and a computer-readable recording medium having this computer program recorded thereon are included in the scope of the present disclosure. Herein, examples of the computer-readable recording medium include a flexible disk, hard disk, CD-ROM, MO, DVD, DVD-ROM, DVD-RAM, BD (Blu-ray (registered trademark) Disc), and semiconductor memory. The computer program is not limited to the program recorded on the recording medium, and may be transmitted via telecommunication lines, wireless or wired communication line, and a network which is typically the Internet.

The exemplary embodiments have been described as examples of the technique of the present disclosure. For this purpose, the accompanying drawings and the detailed description have been provided.

Consequently, the components illustrated in the accompanying drawings and described in the detailed description include not only components which are essential to solve the problems but also components which are not essential to solve the problem in order to exemplify the above technique. Therefore, such inessential components should not be readily construed as being essential based on the fact that such inessential components are illustrated in the accompanying drawings or mentioned in the detailed description.

Further, the above exemplary embodiments have been described to exemplify the technique according to the present disclosure. Consequently, various changes, replacements, additions, and omissions can be carried out within the scope of the claims or a range equivalent to the scope of the claims.

The present disclosure is applicable to an imaging device such as a digital camera having an interchangeable lens barrel.

What is claimed is:

1. A camera body to which a lens barrel including an optical system is detachable and reattachable, the optical system being configured to include a plurality of lenses, the camera body comprising:
   a controller which controls the camera body;
   an image sensor which obtains an optical image formed by the optical system; and
   an image sensor driver which moves the image sensor along an optical axis direction of the optical system,
   wherein the controller is configured to:
      detect an optical feature amount of a subject image of a plurality of frames, wherein the image sensor is at an identical position along the optical axis direction in each of the plurality of frames,
      for each of the plurality of frames, determine a change between the optical feature amount of the subject image and the optical feature amount of the corresponding frame exceeds a predetermined threshold, and
      when the optical feature amount of more than one of the plurality of frames is determined to have changed by more than the predetermined threshold, cause the image sensor driver to move the image sensor from the identical position to a reference position located in a movable range.

2. The camera body according to claim 1, wherein
the plurality of frames includes a first frame, a second frame, and a third frame, and
the controller compares the second and third frames with the first frame, and calculates the change amount of the optical feature amount.

3. The camera body according to claim 1, wherein the controller detects changes in optical feature amounts in a plurality of areas of an image signal corresponding to one screen among image signals obtained from an output of the image sensor.

4. The camera body according to claim 1, wherein the controller adjusts a focus by moving the image sensor in the optical axis direction.

5. The camera body according to claim 4, wherein the controller drives the image sensor driver to move the image sensor to the reference position before adjusting the focus.

6. The camera body according to claim 1, wherein
the movable range of the image sensor includes a close side end and an infinity side end, and
the reference position is at the close side end or the infinity side end of the movable range.

7. The camera body according to claim 1, further comprising an operation unit which is connected to the controller, and changes, according to an operation of a user, an optical state of the subject image obtained by the image sensor,
wherein, when the operation unit is operated, the controller drives the image sensor driver to move the image sensor to a position along the optical axis direction at which a contrast value of an image obtained by the image sensor is maximized.

8. The camera body according to claim 1, wherein the controller obtains the optical feature amounts of a plurality of areas of an image signal corresponding to one screen among image signals obtained from an output of the image sensor, and determines a change in the optical feature amounts of the subject image based on a representative value of the plurality of obtained optical feature amounts.

9. The camera body according to claim 8, wherein the representative value is a maximum value of the plurality of optical feature amounts.

10. The camera body according to claim 1, wherein the optical feature amounts are contrast values.

11. The camera body according to claim 1, wherein the optical feature amounts are brightness values.

12. The camera body according to claim 1, wherein the camera body is electrically incommunicable with the lens barrel.

13. An imaging device comprising:
a lens barrel which includes a plurality of lenses, and a manual operation unit which manually adjusts a focus by moving the plurality of lenses; and
the camera body according to claim 1 which includes an attachment unit to which the lens barrel is attached.

14. The imaging device according to claim 13, wherein the controller automatically adjusts the focus by
determining that the manual operation unit has been operated, based on a change in the optical feature amounts of the subject image, and
driving the image sensor driver to move the image sensor to the reference position according to a result of the determination, and then moving the image sensor in the optical axis direction.

* * * * *